United States Patent Office 2,949,445
Patented Aug. 16, 1960

2,949,445

METHYL METHACRYLATE POLYMERS CONTAINING AMINO RESIDUES

Jules Blake, Springfield, Pa., assignor to E. I. du Pont de Nemours and Company, Wilmington, Del., a corporation of Delaware No Drawing. Filed May 6, 1958, Ser. No. 733,277

4 Claims. (Cl. 260—86.1)

This invention relates to a chemical compound and more particularly to a polymer of methyl methacrylate containing in the polymer chain an aminated or ammoniated glycidyl methacrylate radical.

Polymers of methyl methacrylate find wide use as film-forming materials in coating compositions. Such coating compositions, commonly referred to as methyl methacrylate lacquers, have outstanding durability and gloss retention, however, methyl methacrylate lacquers containing conventional polymers of methyl methacrylate are often difficult to adhere to substrates. For example, such lacquers do not adhere properly to conventional prime coatings such as those commonly used under alkyd resin enamels, aminoaldehyde resin enamels and nitrocellulose lacquers.

It has been found that by introducing an aminated or ammoniated glycidyl methacrylate radical into polymers of methyl methacrylate, the adhesion of coating compositions containing such polymers is greatly enhanced. However, polymers of methyl methacrylate containing aminated or ammoniated glycidyl methacrylate radicals are often somewhat unstable, thus must be used shortly after preparation.

I have found that a particular group of polymers of methyl methacrylate containing aminated or ammoniated glycidyl methacrylate radicals have outstanding adhesion, film-forming properties and storage stability.

The products of this invention are polymers of methyl methacrylate having a relative viscosity of about from 1.117 to 1.196 and containing in the polymer chain the aminated or ammoniated glycidyl methacrylate radical:

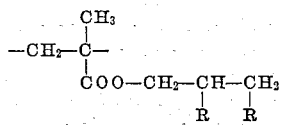

where one R is a hydroxyl group and the second R is an amino residue of a member of the class consisting of ammonia and monoamines, the residue being bonded through amino nitrogen. The aminated or ammoniated glycidyl methacrylate radical exclusive of amino residue comprises about from 3 to 0.2 and preferably about 2% by weight of the total weight of polymer.

The term "polymer of methyl methacrylate" as used herein refers to polymers of methyl methacrylate containing 0.2 to 3% by weight of the glycidyl methacrylate moiety and to polymers of methyl methacrylate containing 0.2 to 3% of the glycidyl methacrylate moiety and up to about 25% by weight of another copolymerizable ethylenically unsaturated monomer which does not react with the glycidyl methacrylate moiety. Such copolymerizable materials include, for example, the alkyl esters of acrylic acid such as methyl acrylate, ethyl acrylate, propyl acrylate and butyl acrylate, the alkyl esters of methacrylic acid such as ethyl methacrylate, propyl methacrylate, butyl methacrylate and lauryl methacrylate, vinyl acetate, acrylonitrile and styrene. Polymers of methyl methacrylate containing at least 97% by weight of polymerized methyl methacrylate and 0.2 to 3% of the glycidyl methacrylate moiety are preferred.

The polymers of methyl methacrylate have a relative viscosity of about from 1.117 to 1.196 corresponding to a molecular weight of about 55,000 to about 105,000. Polymers of methyl methacrylate falling within this range of viscosities have a unique solubility and viscosity which makes it possible, for example, to apply thick, smooth lacquer coatings thereof in a relatively few individual coats. In addition, dried lacquer coatings of such polymers have an outstanding balance of properties such as, for example, durability, gloss and flexability. Polymers of methyl methacrylate having a relative viscosity of substantially below 1.117 have poor outdoor durability, film integrity and impact resistance as compared to the polymers of this invention. Also, such materials having a relative viscosity of substantially below 1.117 are often objectionably thermoplastic, that is, coatings thereof soften on hot days and are easily marred. Polymers of methyl methacrylate having a relative viscosity of substantially above 1.196 are hard to dissolve in conventional lacquer solvents and cannot be formed into lacquers which have a high solids concentration. Also, lacquers of such polymers of methyl methacrylate having a relative viscosity of substantially above 1.196 are difficult to apply because the polymers separate from solution as they are sprayed and form rough uneven coatings.

The polymers of methyl methacrylate used in this invention must also contain 0.2 to 3.0% of the glycidyl methacrylate moiety. Polymers of methyl methacrylate containing less than about 0.2% by weight of the glycidyl methacrylate moiety do not have the adhesion characteristics of the polymers of this invention; thus, coating compositions thereof will not adhere well, for example, to conventional primers. More than about 3% by weight of the glycidyl methacrylate moiety does not offer further advantages compensatory of the additional cost.

Polymers of this invention are extremely water-insoluble and are not even soluble in dilute acetic acid solutions.

The term "relative viscosity" as used herein to specify a property of the polymers of methyl methacrylate is the value obtained by dividing the efflux time of a solution A, of the polymer of methyl methacrylate, by the efflux time of the solvent B used in the solution, the efflux times being measured in accordance with the procedure of A.S.T.M. D-445-46T, Method B. Polymer solution A is a solution of 0.25 gram of the polymer of methyl methacrylate being tested in 50 cc. of ethylene dichloride, and the solvent B is ethylene dichloride. The times are determined at 25° C. in a standard apparatus currently marketed under the designation of Modified Ostwald viscosimeter, series 50.

The polymers of methyl methacrylate of this invention containing the aminated or ammoniated glycidyl methacrylate radical are preferably prepared by copolymerizing methyl methacrylate, glycidyl methacrylate and, if desired, another inert copolymerizable monomer, then reacting the resulting copolymer with aqueous or anhydrous ammonia or one or more monoamines or a mixture of ammonia and one or more monoamines. The copolymers can be prepared by well known methods by polymerizing the monomers in bulk, in solution or in granular form to produce products having the required relative viscosities. Preferably, the reaction is carried out in the presence of a free-radical catalyst. Alternatively, ammonia or a monoamine can be reacted with glycidyl methacrylate and the resulting product can be copolymerized with methyl methacrylate or methyl methacrylate and a small portion of inert copolymerizable monomer to yield the products of this invention.

Monoamines which can be used in preparing the products of this invention are, for example, tertiary butyl amine, ethanolamine, ethyl amine, tertiary octyl amine, diethanolamine, dimethyl amine and methyl ethyl amine. Ammonia and simple aliphatic primary and secondary amines such as 1 to 4 carbon atom alkyl and alkanol amines are preferred because they show little steric hindrance, thus react rapidly. Ammonia is particularly preferred because it reacts rapidly and completely and because it is relatively inexpensive.

In the preferred method of preparing the products of this invention, the monoamine or ammonia and copolymer are mixed, then heated, preferably in a closed system under a pressure of 20 to 100 p.s.i., until the reaction of the monoamine or ammonia and the epoxy groups in the copolymer has run substantially to completion. The particular reaction conditions vary with the amount and reactivity of the monoamine or ammonia. Usually, the reaction mixture is heated for from 2 to 30 hours and preferably 5 to 10 hours at about from 50 to 150° C. and preferably 85 to 100° C. Preferably an excess of the monoamine or ammonia is added to the reaction mixture. This speeds the reaction and insures that substantially all of the epoxy groups react. Using an excess of ammonia or monoamine and, in the case of volatile amines such as ammonia, running the reaction under pressure also insures that substantially all of the epoxy groups each react with only one molecule of ammonia or monoamine. The amount of unreacted epoxy groups, hence the completeness of the reaction, can be determined by adding hydrochloric acid to a portion of the reaction mixture and then back-titrating the solution with silver nitrate.

The amination reaction can be carried out in volatile solvents such as, for example, toluene, xylene, methyl isobutyl ketone, butyl alcohol, amyl alcohol, isopropyl alcohol and other aliphatic, cycloaliphatic and aromatic hydrocarbons, ethers, ketones and alcohols, such as are conventionally used in coating compositions. Hydroxylated solvents such as alcohols are preferred because they catalyze the amination reaction. Small portions of water also can be added to the solvent mixture to catalyze the reaction.

It is believed that during the amination reaction the epoxy ring on the glycidyl methacrylate moiety opens and the ammonia or monoamine is bonded to one of the ring carbon atoms through amino nitrogen; for example, in the case of ammonia the reaction is believed to proceed substantially as follows:

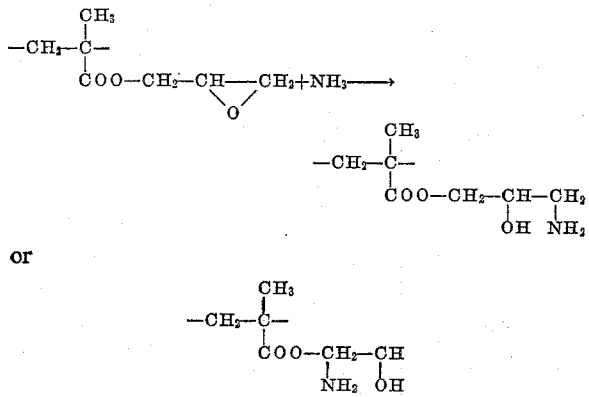

The products of this invention are characterized by their outstanding adhesion, film-forming properties and storage stability. These polymers can be used in coating compositions on a wide variety of substrates such as, for example, steel, tin plate, aluminum, linoleum, glass and substrates coated with a variety of conventional coating compositions.

Dried coating compositions containing the polymers of this invention adhere outstandingly to conventional metal-protecting and rust-inhibiting primers and have excellent gloss, durability and blister resistance. Conventional pigments, plasticizers and modifiers such as flow-control agents and dispersing agents can, and preferably are added to such coating compositions.

The following examples are intended to illustrate the invention and not to limit it in any way. Parts are by weight unless otherwise specified.

*Example I*

The following materials are charged into an autoclave and heated under autogenous pressure at 90° C. for 6 hours:

| | Parts |
|---|---|
| Methyl methacrylate | 97.8 |
| Glycidyl methacrylate | 2.2 |
| Benzoyl peroxide initiator | 0.6 |
| Toluene | 70.0 |
| Isopropyl alcohol | 30.0 |
| | 200.6 |

Next, the charge is diluted to 30% solids with isopropyl alcohol, then anhydrous ammonia is added to the closed system until the pressure in the autoclave reaches 45 p.s.i. and the mole ratio of ammonia to epoxy groups in the glycidyl methacrylate is 22:1. The charge is heated at 92° C. for 7 hours, then the excess ammonia is stripped off under vacuum. The resulting polymer shows no unreacted epoxy groups when it is titrated with hydrochloric acid, then back-titrated with silver nitrate. The polymer has a relative viscosity of 1.185 determined by the procedure described hereinbefore.

The storage stability of the polymer described above is tested by heating a 30% solution of the polymer in a solvent consisting of 45% toluene and 55% isopropyl alcohol at 50° C. After 41 days at this temperature, the polymer solution shows no change in viscosity.

The polymeric solution described above is coated directly onto the side seams of food cans shortly after the seams are soldered. As the hot seams cool, the solvent evaporates leaving a protective film which protects the seams from rusting. Similar solutions of conventional polymers of methyl methacrylate which do not contain aminated or ammoniated glycidyl methacrylate radicals do not stick to cans as described above, but flake and chip off the seams during processing.

*Example II*

Methyl methacrylate and glycidyl methacrylate are polymerized as described in the preceding example, then a 30% solution of the resulting polymer in toluene-isopropyl alcohol solvent is charged to an autoclave together with the following materials and heated at 85° C. for 72 hours at autogenous pressure:

| | Parts |
|---|---|
| Copolymer of 97.8 parts of methyl methacrylate and 2.2 parts of glycidyl methacrylate (30% solution) | 125.0 |
| Butanol | 30.0 |
| Methyl ethyl ketone | 32.0 |
| Distilled water | 3.0 |
| Ethanol amine | 0.43 |
| | 190.43 |

The resulting product contains a polymer of methyl methacrylate having a relative viscosity of between 1.117 and 1.196 and containing 2.2% of ammoniated glycidyl methacrylate radicals based on the total weight of polymer exclusive of amino residue.

The polymeric solution described above is diluted to about 20% solids with an equal weight mixture of methyl ethyl ketone and toluene and flow coated onto steel panels which are prime coated with a conventional pigmented 50% soybean oil modified glycerol phthalate alkyd resin. The coated article is baked at 93° C. for 30 minutes. The coated panel is tested for adhesion by cutting two two-inch long marks in the form of an X vertically through the coating down to the metal, securely pressing a strip of pressure-sensitive cellophane adhesive type over the X, then pulling the tape off with a force approximately tangential to the coated surface. In the tape test none of the coating of this example is removed with the tape. When the same test is performed with a coating which contains a polymer of methyl methacrylate which does not contain the aminated glycidyl methacrylate radical, substantially all of the methyl methacrylate lacquer topcoat is stripped from the prime coat. Dried coatings containing the product of this example also have excellent blister resistance, durability and gloss.

*Example III*

A polymer of 97 parts of methyl methacrylate and 3 parts of glycidyl methacrylate is prepared as described in Example I. 125 parts of a 30% solution of this polymer in toluene-isopropyl alcohol solvent is charged to closed reaction vessel along with 20 parts of butanol and 0.77 part of tertiary butyl amine. The reaction vessel is sealed and heated at 91° C. for 48 hours. The resulting polymer of methyl methacrylate has a relative viscosity of between 1.117 and 1.196 and contains 3% of aminated glycidyl methacrylate radical exclusive of amino residue. The polymer has properties similar to those of the polymers of the preceding examples.

*Example IV*

About 125 parts of a 30% solution in toluene-isopropyl alcohol solvent of the polymer of methyl methacrylate and glycidyl methacrylate described in Example I is charged to a closed reaction vessel along with 1.6 parts of a 20% aqueous solution of dimethyl amine. The reaction mixture is heated at 91° C. for 48 hours to yield a polymer having properties similar to those of the polymers of the preceding examples.

*Example V*

A polymer is prepared by heating 99 parts of methyl methacrylate with 1 part of glycidyl methacrylate, 105 parts of toluene, 45 parts of acetone and 0.7 part of benzoyl peroxide at 85° C. for 16 hours at atmospheric pressure. To the reaction mixture are added 25 parts of isopropyl alcohol and 6.5 parts of a 28% solution of aqueous ammonia, then the reaction mixture is heated at 85° C. for an additional 16 hours. The resulting polymer of methyl methacrylate has a relative viscosity of about 1.15 and properties similar to the products of the preceding examples.

*Example VI*

A terpolymer is prepared by heating 92.8 parts of methyl methacrylate, 5 parts of lauryl methacrylate and 2.2 parts of glycidyl methacrylate along with 0.68 part of benzoyl peroxide, 105 parts of toluene and 45 parts of isopropyl alcohol at autogenous pressure for 16 hours at 85° C. Sixty-seven parts of isopropyl alcohol are added to the reaction mixture followed by 4.2 parts of anhydrous ammonia. Finally, the reaction is continued for an additional 7.5 hours at 85° C. to yield a polymer similar in properties to the polymers of the preceding examples.

*Example VII*

Tertiarybutylamino hydroxy-propyl methacrylate is prepared by adding 137.5 parts of glycidyl methacrylate dropwise over a period of 45 minutes to a solution of 450 parts of tertiary butyl amine in 155 parts by weight of water. The reaction temperature during this period is held at 40 to 50° C. The mixture is stirred for 3.5 hours without heating, then water and unreacted amine are removed by distillation at 60° C. and a pressure of 30 mm. of mercury absolute. The product is fractionally distilled at 95 to 110° C. at 0.5 mm. mercury absolute pressure, then recrystallized from petroleum ether (B.P. 30 to 60° C.) to yield 112 parts of crystalline tertiarybutylamino hydroxy-propyl methacrylate melting between 55 and 60° C.

A polymer of methyl methacrylate is prepared by heating 97 parts of methyl methacrylate and the 3 parts of the tertiarybutylamino propyl methacrylate prepared above with 150 parts of toluene and 0.7 part of azobisisobutyronitrile for 16 hours at 75 to 78° C. in a closed polymerization vessel with agitation. The resulting product has properties similar to those of the polymers in the preceding examples.

I claim:

1. A polymer predominately of methyl methacrylate having a relative viscosity of about from 1.117 to 1.196 and consisting essentially of polymerized methyl methacrylate and radicals of the formula:

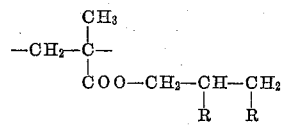

wherein one R is a hydroxyl group and the second R is an amino residue of a member of the class consisting of ammonia and primary and secondary monoamines, said residue being bonded through amino nitrogen, said radical exclusive of amino residue constituting about from 3 to 0.2% by weight of the total weight of polymer.

2. A polymer of claim 1 wherein said radicals have the formula:

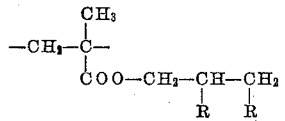

wherein one R is a hydroxyl group and the second R is —NH$_2$.

3. A polymer of claim 1 wherein said radicals constitute approximately 2% of the total weight of polymer.

4. A polymer of claim 1 containing polymerized in the polymer chain up to 25% of a monomer, in addition to methyl methacrylate, having ethylenic unsaturation as the sole reactive group.

References Cited in the file of this patent

UNITED STATES PATENTS

| | | |
|---|---|---|
| 2,676,166 | Webers | Apr. 20, 1954 |
| 2,737,496 | Catlin | Mar. 6, 1956 |
| 2,780,608 | Hurwitz et al. | Feb. 5, 1957 |
| 2,781,335 | Cupery | Feb. 12, 1957 |
| 2,868,760 | Staicopoulos | Jan. 13, 1959 |